United States Patent
Rajakumar

(10) Patent No.: US 6,989,966 B2
(45) Date of Patent: Jan. 24, 2006

(54) SLIDER HAVING PLURAL LEADING STEP-LEVEL SLOTS

(75) Inventor: Rajahankar Rajakumar, Richfield, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 50 days.

(21) Appl. No.: 10/295,105

(22) Filed: Nov. 15, 2002

(65) Prior Publication Data

US 2003/0165031 A1    Sep. 4, 2003

Related U.S. Application Data

(60) Provisional application No. 60/357,576, filed on Feb. 15, 2002.

(51) Int. Cl.
*G11B 5/60* (2006.01)
*G11B 17/32* (2006.01)
*G11B 21/21* (2006.01)

(52) U.S. Cl. ............... 360/235.6; 360/236; 360/236.3
(58) Field of Classification Search ............. 360/235.6, 360/236.4, 236, 236.3
See application file for complete search history.

(56) References Cited

U.S. PATENT DOCUMENTS

| | | | |
|---|---|---|---|
| 4,212,044 A | 7/1980 | Plotto | 360/103 |
| 4,486,798 A | 12/1984 | Feliss et al. | 360/103 |
| 4,510,541 A | 4/1985 | Sasamoto | 360/97 |
| 5,210,666 A | 5/1993 | Chapin et al. | 360/103 |
| 5,406,432 A | 4/1995 | Murray | 360/103 |
| 5,467,238 A | 11/1995 | Lee et al. | 360/128 |
| 5,490,025 A | 2/1996 | Dorius et al. | 360/103 |
| 5,751,517 A | 5/1998 | Agarwal | 360/103 |
| 5,831,792 A | 11/1998 | Ananth | 360/103 |
| 5,926,343 A * | 7/1999 | Dorius et al. | 360/235.6 |
| 6,188,547 B1 | 2/2001 | Gui et al. | 360/236.5 |
| 6,212,032 B1 | 4/2001 | Park et al. | 360/103 |
| 6,226,859 B1 | 5/2001 | Dorius et al. | 29/603.12 |
| 6,324,747 B1 | 12/2001 | Boutaghou et al. | 29/603.12 |
| 6,356,412 B1 | 3/2002 | Levi et al. | 360/237 |

(Continued)

FOREIGN PATENT DOCUMENTS

| | | | |
|---|---|---|---|
| JP | 01245480 A | * | 9/1989 |
| JP | 03132981 A | * | 6/1991 |

(Continued)

*Primary Examiner*—Craig A. Renner
(74) *Attorney, Agent, or Firm*—Westman, Champlin & Kelly

(57) ABSTRACT

An AAB slider has a leading edge generally impinging fluid flow due to movement of a medium relative to the slider. A cavity dam defines a continuous air bearing surface that extends over a region between the sides of the slider and between at least one sub-ambient cavity and the leading edge. Step level slots in the air bearing surface at the leading edge admit fluid into the region of the air bearing surface. Side rails on the slider extend rearward from the cavity dam to form the sub-ambient cavity. The air bearing surface is characterized by the absence of a channel adjacent the leading edge that extends between the sides of the slider. A center rail extends rearward from the cavity dam to the trailing edge and supports a transducer. The arrangement is such that airflow to the transducer is minimized, thus minimizing particulate matter from accumulating on the trailing edge slider features, including the transducer.

15 Claims, 5 Drawing Sheets

U.S. PATENT DOCUMENTS

| | | | |
|---|---|---|---|
| 6,462,909 B1 * | 10/2002 | Boutaghou et al. | 360/235.6 |
| 6,515,831 B1 * | 2/2003 | Sannino et al. | 360/235.6 |
| 6,683,755 B2 * | 1/2004 | Koishi | 360/235.6 |
| 2002/0008938 A1 | 1/2002 | Nath et al. | 360/235.6 |
| 2002/0030938 A1 | 3/2002 | Boutaghou et al. | 360/236.3 |
| 2002/0145828 A1 | 10/2002 | Mundt et al. | 360/235.6 |

FOREIGN PATENT DOCUMENTS

| | | | |
|---|---|---|---|
| JP | 06-013369 | | 1/1994 |
| JP | 06333354 A | * | 12/1994 |
| JP | 09198638 A | * | 7/1997 |
| WO | WO 99/00792 | | 7/1999 |

* cited by examiner

SLIDER HAVING PLURAL LEADING STEP-LEVEL SLOTS

CROSS-REFERENCE TO RELATED APPLICATION

This application claims priority of U.S. Provisional Application No. 60/357,576 filed Feb. 15, 2002 for "AAB Features to Improve Particle Insensitivity".

FIELD OF THE INVENTION

This invention relates to aerodynamic sliders that position transducing heads relative to a movable medium, and particularly to proximity advanced air bearing (AAB) sliders used in disc drive data storage systems.

BACKGROUND OF THE INVENTION

In magnetic disc drive storage devices, digital data are written to and read from a thin layer of magnetizable material on surfaces of one or more rotating discs. Read and write operations are performed through read and write transducers that are carried on a slider body. The slider and transducers are sometimes collectively referred to as a head, and typically a single head is associated with each disc surface. Air is dragged by the disc due to rotation of the disc, generating a generally circular airflow pattern around the disc axis. Each slider body includes an air bearing surface (ABS) that reacts with the air dragged beneath the ABS due to rotation of the disc. The air flow develops a lifting force to lift and "fly" the head above the disc surface.

The slider body is mounted to an actuator arm that is rotated about an axis distal from the disc axis. As the actuator arm rotates about its axis, the slider body is moved along an arcuate path that is generally radial across the disc, to thereby confront selected concentric recording tracks on the disc. Due to the arcuate path of the slider relative to the disc, the skew of the slider relative to the circular tracks on the disc changes as the slider is moved radially across the disc. More particularly, the skew changes between a positive and negative skew as the slider is moved between outer and inner radial tracks. Since the airflow confronting the slider is generally tangential to the track, the changing skew of the slider alters the slider orientation relative to the airflow direction as the slider is moved between the outer and inner tracks. Consequently, the airflow impinges the leading edge of the slider and one or the other side of the slider as the slider is radially moved relative to the disc.

The objectives of most disc drive technology advances are directed to increasing areal density of data recorded on magnetic media and to increasing accuracy of recording and recovering of data. These objectives often require lower fly heights of the slider and transducer to the recording media. To achieve these objectives, a class of sliders has been developed known as proximity advanced air bearing (AAB) sliders. AAB sliders are characterized by employing air bearing surfaces (ABS) that are contoured to achieve desired fly characteristics. The air bearing surface of the AAB slider usually includes stepped regions that permit the air to pass beneath the ABS. Without these steps, the ABS may be too close to the disc to permit air to enter the region between the disc and the slider. The stepped ABS admits air into the region beneath the slider, thereby creating the hydrodynamic lifting force to lift the slider and fly it above the disc surface.

One problem of sliders is that particulate matter (particles and debris) may accumulate on the slider and on the transducer. The accumulated particulate matter may adversely affect the flying characteristics of the slider, and may adversely affect the transducing properties of the transducers. Moreover, if the accumulation of particulate matter becomes too great, the slider may drag the particulate matter against the media surface, thereby damaging the slider, transducer and/or disc. In any case, damage may occur, resulting in a loss of data, and in worst cases a failure of the disc drive. Particulate matter is particularly adverse to AAB sliders due to their low flying characteristics. Moreover, the step level features at the leading edges of the ABS of AAB sliders usually direct airflow toward the trailing edges of the slider. The airflow carries particulate matter, which accumulates on the transducer at the trailing edge, leading to head failure.

To reduce accumulation of particulate matter and thereby improve particle insensitivity performance, some AAB sliders are designed to block particles from entering the region beneath the slider. One technique is to employ an ABS that extends across the leading edge of the slider, thereby effectively blocking the particles from entering the region beneath the slider. However, the low flying ABS also blocks airflow, thereby reducing pressurization of the air bearing surface and adversely affecting flying characteristics of the head. Consequently, it has been proposed to include a groove or channel in the ABS across the width of the slider at, or immediately following, the leading edge. The concept of the groove, which could be at either the ABS step level or the slider negative pressure cavity level, was to improve the AAB performance and also to accumulate particulate matter entering the region beneath the slider in the groove. However, when the slider was in a skew orientation such that airflow was from one side of the slider or the other, the groove formed an air channel that directed air from the windward side of the slider toward the leeward side. The airflow carried particulate matter in the groove toward the trailing edge of the slider and the transducer. Consequently, air and particulate flow toward the trailing edge was promoted by the groove, thereby increasing accumulation of particulate matter at the transducer and the trailing edge of the slider.

The present invention provides a solution to this and other problems, and offers other advantages over the prior art.

SUMMARY OF THE INVENTION

An AAB slider has a leading edge generally impinging fluid flow due to movement of a medium relative to the slider. A transducer is supported by the slider adjacent a trailing edge. A cavity dam defines an air bearing surface extending to the leading edge. Means inhibits fluid flow to the transducer. The inhibiting means is characterized by the absence of a channel in the air bearing surface that extends between the sides of the slider.

In preferred embodiments, the AAB slider includes first and second side rails extending rearward from the cavity dam along opposite sides of the slider and a center rail extending rearward from the cavity dam to the trailing edge between the side rails. The transducer is supported on the center rail at the trailing edge. Sub-ambient cavities are formed between the first side rail and the center rail and between the second side rail and the center rail.

In some embodiments, a step cavity region in the air bearing surface is adjacent at least the center rail and the sub-ambient cavities.

The slider is useful in a disc drive storage device wherein the slider is supported by an actuator arm that moves the slider in an arc across recording tracks of a storage medium.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
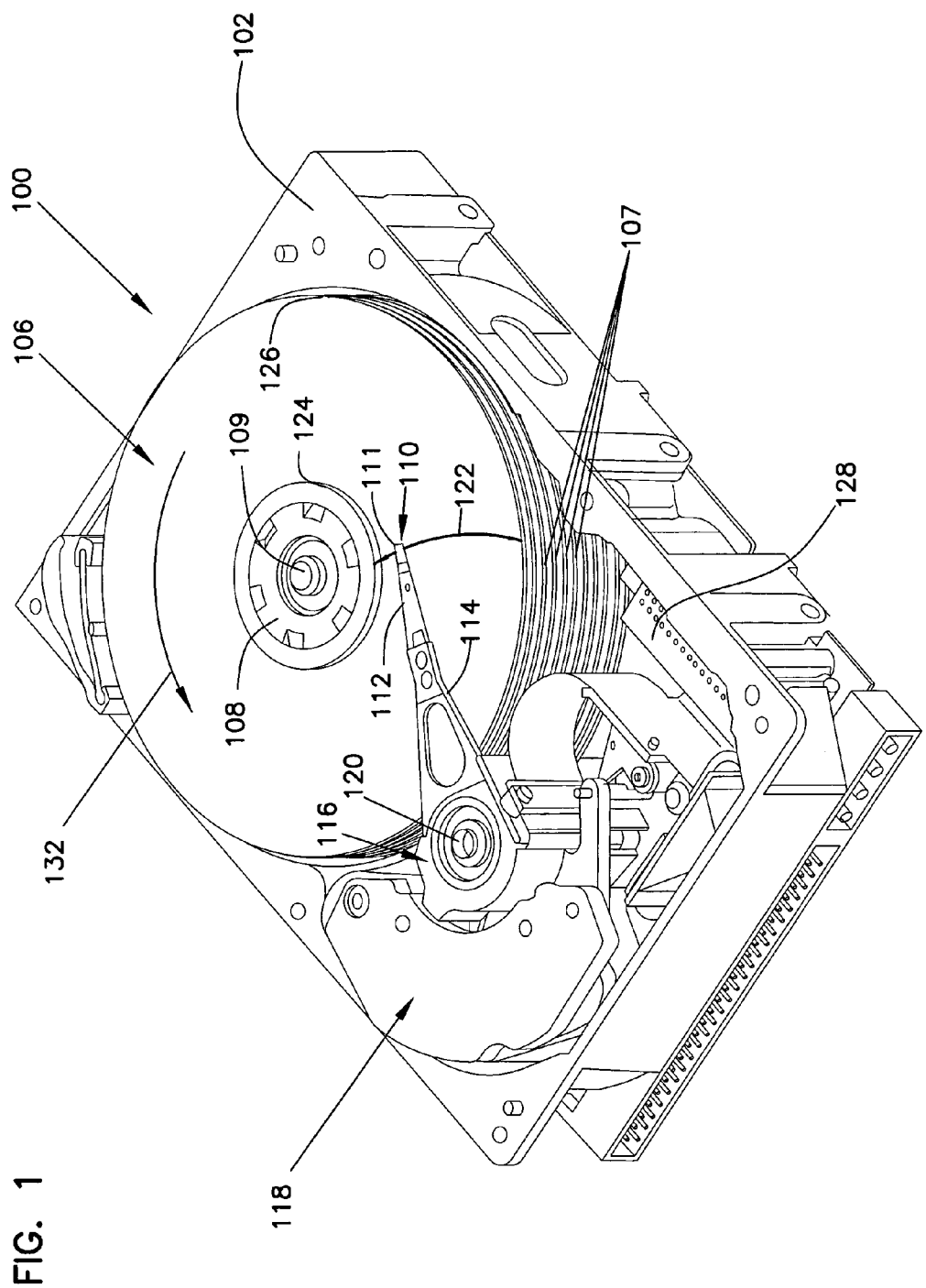
FIG. 1 is a perspective view of a disc drive in which the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108 for rotation in the direction of arrow 132. Disc pack 106 includes a plurality of individual discs 107, which are mounted for co-rotation about central axis 109. Each disc surface has an associated slider 110 that is mounted in disc drive 100 for communication with the confronting disc surface. Slider 110 is arranged to fly above the associated disc surface of an individual disc of disc pack 106, and carries a transducing head 111 arranged to write data to, and read data from, concentric tracks on the confronting disc surface. In the example shown in FIG. 1, sliders 110 are supported by suspensions 112 which are in turn attached to track accessing arms 114 of an actuator 116. Actuator 116 is driven by a voice coil motor (VCM) 118 to rotate the actuator, and its attached sliders 110, about a pivot shaft 120. Rotation of actuator 116 moves the heads along an arcuate path 122 to position the heads over a desired data track between a disc inner diameter 124 and a disc outer diameter 126.

Voice coil motor 118 is operated by position signals from servo electronics included on circuit board 128, which in turn are based on error signals generated by heads 111 and position signals from a host computer (not shown). Read and write electronics are also included on circuit board 128 to supply signals to the host computer based on data read from disc pack 106 by the read portions of heads 111, and to supply write signals to the write portions of heads 111 to write data to the discs.

During operation, discs 107 drag air under respective sliders 110 along the direction approximately parallel to the tangential velocity of the discs. As air passes beneath the air bearing surface of the slider, air compression along the airflow path causes the air pressure between the discs and the air bearing surfaces to increase, thereby creating a hydrodynamic lifting force that counteracts any load force provided by suspensions 112. Consequently, sliders 110 lift from and fly above, or in close proximity to, the disc surfaces. Generally speaking, during operation, the air bearing surface(s) will generally be positioned closer to the disc surface than any other surface on the slider. The air bearing surface(s) are generally in a plane that, for purposes of the present description, are referred to as the air bearing surface (ABS) plane. The slider may include multiple air bearing surfaces that are generally coplanar within the ABS plane.

During operation of the disc drive, slider 110 is typically configured to pitch and roll in accordance with the various topographical features associated with the disc surface. Usually, the slider is configured to demonstrate an operational pitch so that the trailing edge is in closer proximity to the disc surface than the leading edge. Moreover, some sliders include a slight curvature in the length and/or width directions. Such curvatures are commonly referred to as slider crown curvature and slider cross curvature. It is understood that the surfaces and surface planes described herein, including the ABS plane, may reflect slider crown and cross curvature, rather than being perfectly flat.

Finally, reference will be made to surfaces having a relative depth to each other. For purposes of the present description, it shall be assumed that the described depths are measured from the ABS plane. Thus, a surface, such as a cavity surface, having a deep or large depth will be further displaced from the ABS plane than a surface, such as a step surface, having a shallow or small depth. The ABS plane will illustratively be assigned a depth value of zero.

Figure 2:
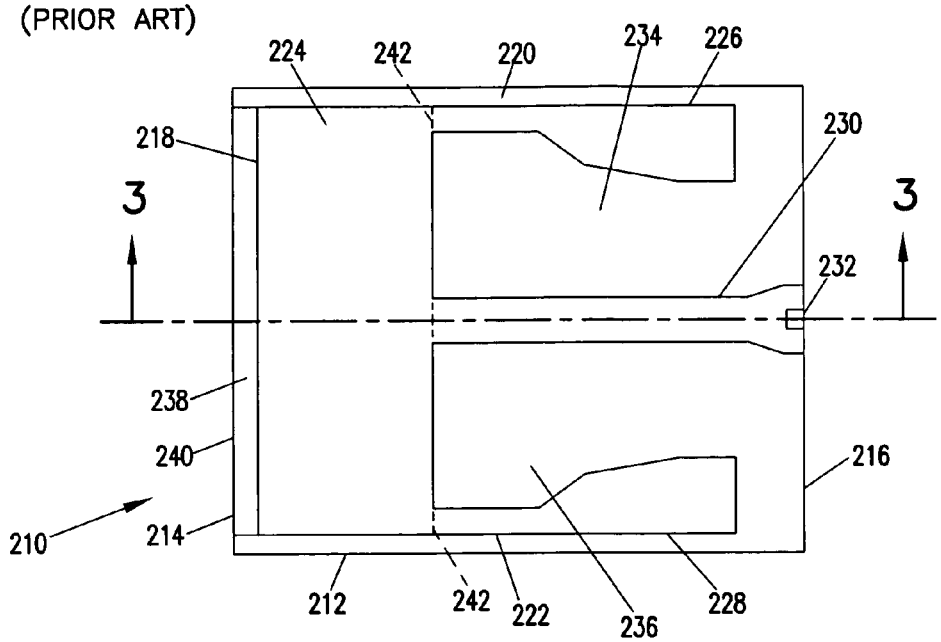
FIG. 2 is a plan view of the bottom surface of a prior advanced air bearing (AAB) slider illustrating the air bearing surface (ABS) thereof.
Figure 3:
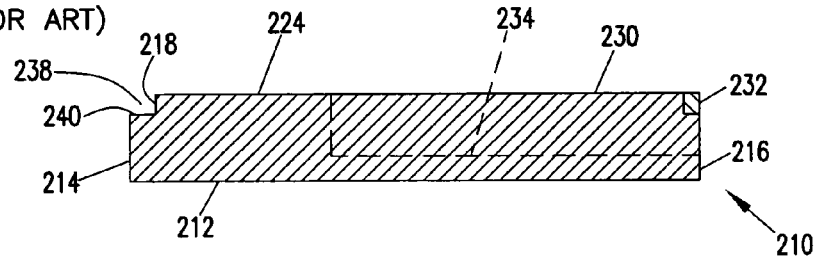
FIG. 3 is a section view taken at line 3—3 in FIG. 2.

FIGS. 2 and 3 illustrate plan and section views of an AAB slider 210 in accordance with one form of the prior art. Slider 210 comprises a slider body 212 having a leading edge 214 and trailing edge 216. A cavity dam 218 is positioned across the width of the slider between sides 220 and 222 and forms an air bearing surface 224 that confronts the recording disc 107 (shown in FIG. 1). Side rails 226 and 228 extend rearward from cavity dam 218 adjacent the sides 220 and 222, respectively, of the slider. Similarly, a center rail 230 extends from a central portion of cavity dam 218 to the trailing edge 216 of the slider. The trailing edge of center rail 230 includes a transducer 232 in the form of a read/write transducer. As shown in FIG. 2, side rails 226 and 228 do not extend to the trailing edge of the slider, whereas center rail 230 does extend to the trailing edge of the slider. Since the pitch of the slider during operation places the trailing edge of the slider closest to the disc surface, the extension of the center rail to the trailing edge places the transducer at the trailing edge in closest proximity to the disc surface. Since side rails 226 and 228 do not extend to the trailing edge, slider features at the ABS level at the trailing edge are minimized, thereby minimizing contact with the confronting disc surface due to roll of the slider during flying. Other versions of prior art sliders might eliminate the center rail, instead employing an ABS level island at the trailing edge supporting the transducer, or might extend the side rails to the trailing edge and place a transducer at the trailing edge of one or both side rails.

A first sub-ambient pressure cavity 234 is formed behind cavity dam 218 between side rail 226 and center rail 230, and a second sub-ambient pressure cavity 236 is formed behind cavity dam 218 between side rail 228 and center rail 230. A channel 238 extends along the leading edge of the slider to form a step level surface 240 at a small depth below the ABS 224.

Rails 226, 228 and 230 are shown separated from cavity dam 218 by dashed lines 242 to indicate that rails 226, 228 and 230 may have configurations of one or more step levels and ABS levels as may be required for a specific design. The particular arrangement or configuration of step levels and ABS levels in rails 226, 228 and 230 are not part of the present invention. Typically, the depth(s) of step levels, including channel 238, are of the order of about 0.1 to 0.3 microns below ABS 224 and co-planar ABS surfaces on rails 226, 228 and 230. Also typically, the cavity levels form cavity surfaces in cavities 234 and 236 that are 1–3 microns below the ABS level. Transducer 232 is ordinarily at the ABS level and at the trailing edge 216.

As previously stated, the particular configuration of the step levels is not particularly important to the present invention. Nevertheless, step level channel 238 extends across the width of the slider at the leading edge and is important to the performance of slider 210 because it facilitates the admission of air into the region between ABS 224 and the confronting disc surface, thereby allowing the slider to lift from and fly above or adjacent the confronting disc.

Figure 4:
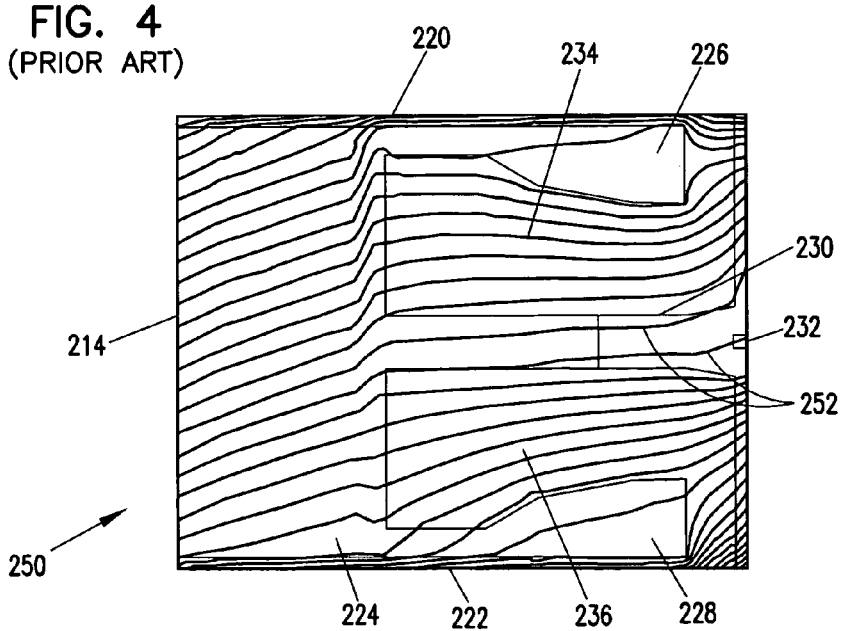
FIG. 4 is a plan view, as in FIG. 2, illustrating the airflow pattern for the slider illustrated in FIG. 2.

One or the other of side rails 226 and 228 is an inside rail that is radially closer to disc axis 109 (FIG. 1) of the confronting disc than the other rail, which is the outside rail. Whether a given rail 226 or 228 is an inside rail or outside rail is also dependent upon whether the slider 210 is an upper or lower slider, confronting the upper or lower recording surface of the respective disc. In any case, as slider 210 is moved by the actuator arm, such as arm 114 and suspension 112 (FIG. 1), between an inner radial position and an outer radial position, the skew of the slider changes from a negative to a positive skew so that the flow of air, dragged by the disc tangentially to the direction of rotation, changes to confront the slider at one or the other side 220 or 222. FIG. 4 illustrates the airflow 250 at a given skew orientation of slider 210 impinging or confronting side 222. For purposes of the present description, the sliders will be described at a skew such that the flow of air is generally toward side 222.

As shown in FIG. 4, the air is admitted through the step level channel 238 to the ABS surface 224, and follows a pattern generally parallel to the confronting flow 250. Most of the airflow confronting leading edge 214 is across ABS surface 224 on the cavity dam and thence along the ABS surfaces on rails 226, 228 and 230 or though sub-ambient pressure cavities 234 and 236 to the trailing edge of the slider. Due to the skew of the slider, some airflow impinging or confronting leading edge 214 adjacent side 220 is diverted to the side 220 of the slider. Moreover, some air flow impinging side 222 passes over the ABS and step surfaces on side rail 228 to the trailing edge or to sub-ambient cavity 236. As shown particularly by flow lines 252, some air flows along center rail 230 to transducer 232. Consequently, debris carried by the airflow 252 will accumulate at the trailing edge of slider 210 adjacent, or on, transducer 232.

Figure 5:
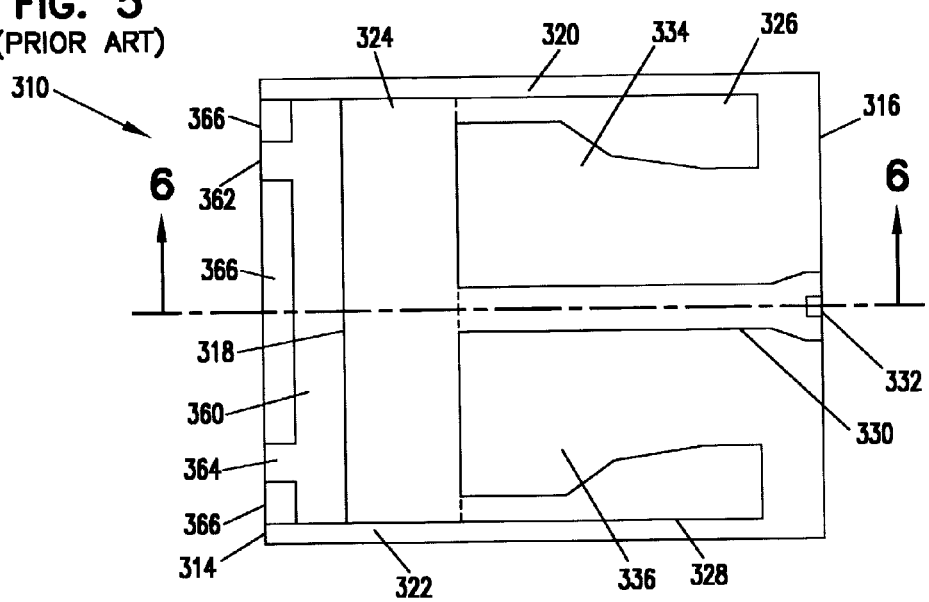
FIGS. 5 and 6 are plan and section views, as in FIGS. 2 and 3, of a second prior AAB slider.
Figure 6:
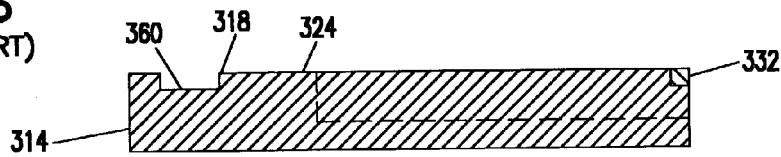

FIGS. 5 and 6 illustrate an AAB slider 310 that is an improvement of the AAB slider 210 illustrated in FIGS. 2 and 3. Slider 310 is more fully described in U.S. application Ser. No. 10/114,843 filed Apr. 3, 2002 by Mundt et al., and assigned to the same Assignee as the present invention. A step level cross channel 360 extends across the width of the slider immediately behind, or downstream from, the leading edge 314 of the slider between sides 320 and 322. Cavity dam 318 includes ABS 324, and side rails 326 and 328 and center rail 330 extend rearward from the cavity dam. Center rail 330 extends to the trailing edge 316 of the slider and carries transducer 332 at the trailing edge. A first sub-ambient pressure cavity 334 is formed behind cavity dam 318 between side rail 326 and center rail 330, and a second sub-ambient pressure cavity 336 is formed behind cavity dam 318 between side rail 328 and center rail 330. Step level slots 362 and 364 admit air into cross channel 360 to permit air to reach ABS 324. In this case, a plurality of islands 366 are formed at the ABS level and at the leading edge to inhibit (block) debris from entering the region of the ABS.

Figure 7:
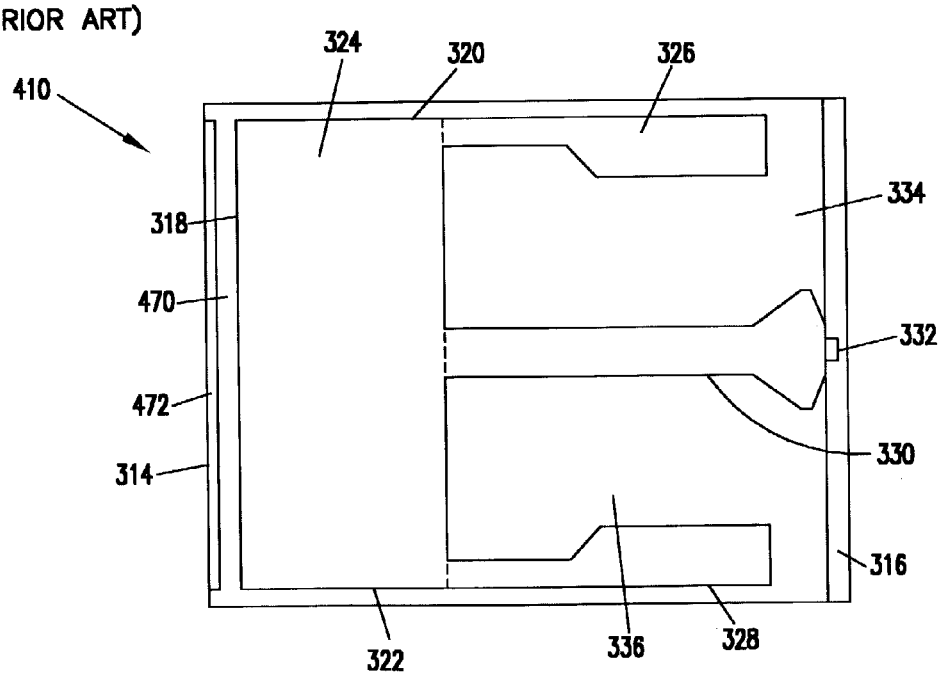
FIG. 7 is a plan view, as in FIG. 2, of a third prior AAB slider.

FIG. 7 shows a similar slider 410, also described in the aforementioned Mundt et al. Application. Slider 410 is similar to slider 310 illustrated in FIGS. 5 and 6 except that instead of employing a step level cross channel 360, slider 410 employs a cavity level cross channel 470. Island 472 is at the ABS level and may or may not include step level slots like slots 362 in the embodiment of FIGS. 5 and 6.

Figure 8:
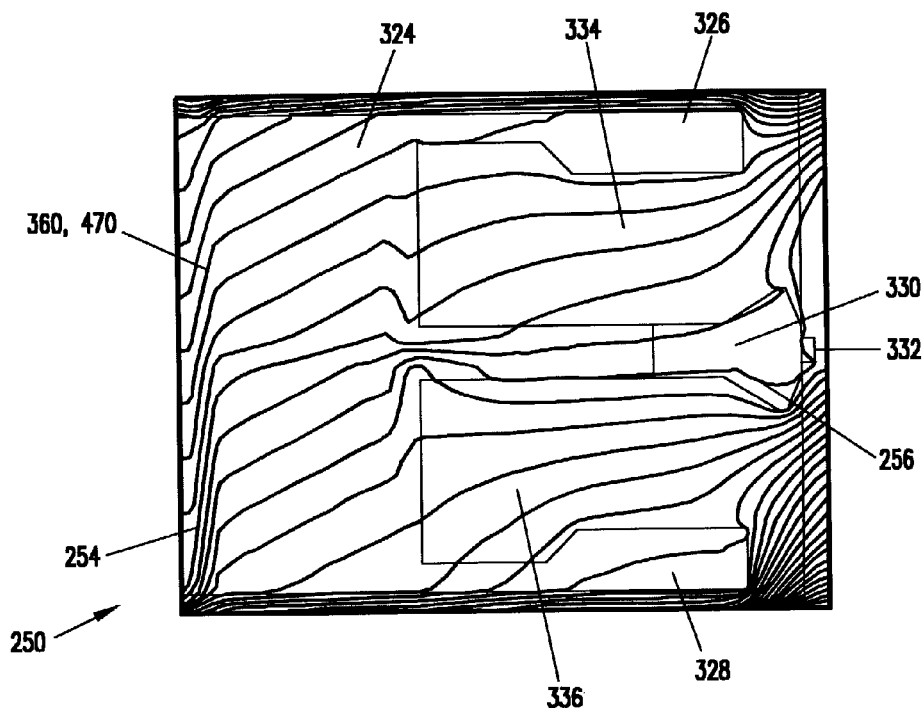
FIG. 8 is a plan view, as in FIGS. 5 and 7, illustrating the airflow pattern for the sliders illustrated in FIGS. 5 and 7.

The purpose of the ABS level islands 366 or 472 shown in FIGS. 5–7 is to block debris from reaching ABS 324 of the slider and hence from reaching the trailing edge of the slider to contaminate or accumulate particulate matter on slider features at the trailing edge, including on or adjacent transducer 332. While the islands are effective to block debris when the slider 310 or 410 is oriented at a zero skew, they are not as effective when the slider is skewed such that airflow partially impinges one or the other sides of the slider. More particularly, as shown in FIG. 8, when the slider is skewed to the airflow 250, air flows through the cross channel 360 or 470 as shown by flow pattern 254 and thence across ABS 324 creating a flow pattern 256 over center rail 330 to transducer 332.

Figure 9:
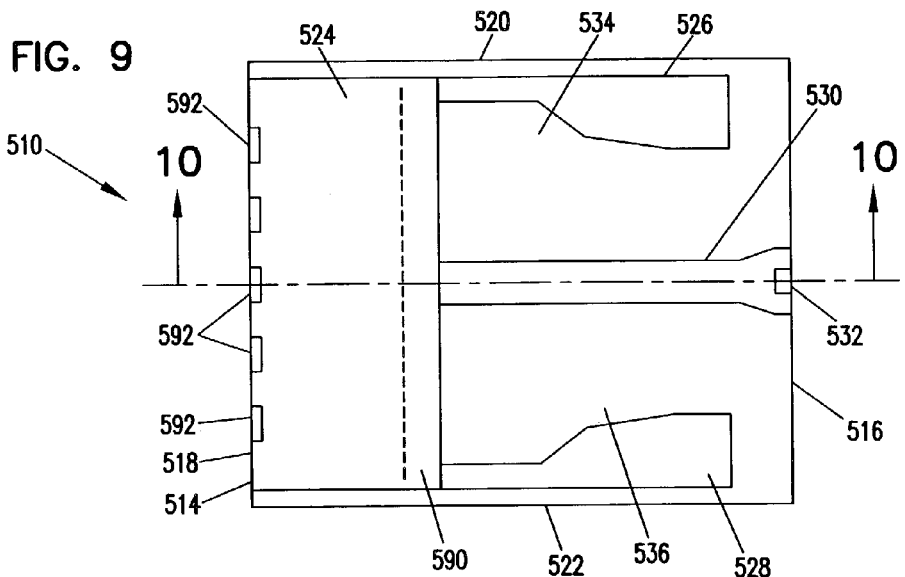
FIG. 9 is a plan view of the bottom surface of an AAB slider according to an embodiment of the present invention.
Figure 10:
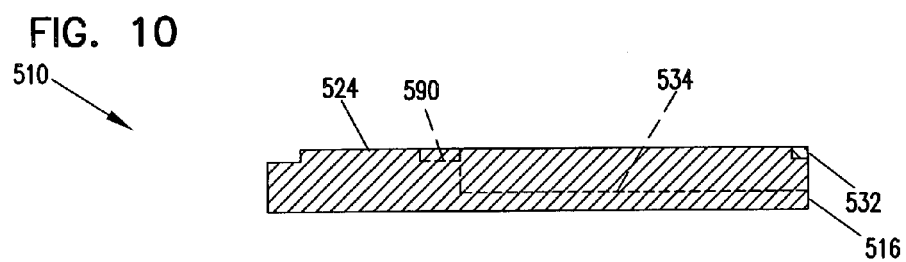
FIG. 10 is a section view taken at line 10—10 in FIG. 9.

FIGS. 9 and 10 illustrate an AAB slider in accordance with an embodiment of the present invention. In this case, the cavity dam 518 forms ABS 524 that extends from the sub-ambient cavities 534 and 536 to spaced-apart step level slots 592 and to leading edge 514 between adjacent slots 592. The plurality of spaced-apart step level slots 592 are formed along the leading edge to admit air into the region of the ABS, but without a cross channel across the width of the slider behind slots 592. Side and center rails 526, 528 and 530 extend rearward of cavity dam 518, with side rails 526 and 528 being adjacent sides 520 and 522, respectively, and center rail 530 extending to trailing edge 516 and supporting transducer 532 at the trailing edge and at the ABS level. Rails 526 and 530 form the first sub-ambient cavity 534 behind or downstream of cavity dam 518, and rails 528 and 530 form the second sub-ambient cavity 536 behind or downstream of cavity dam 518. As in the case of sliders 210, 310 and 410, rails 526, 528 and 530 may include various step level cavities for tailoring the flying characteristics of the slider. In addition, a region 590 of cavity dam 518 adjacent sub-ambient cavities 534 and 536 may include step level cavities in configurations for optimal flying characteristics. Nevertheless, air bearing surface 524 is continuous and unbroken between the sides of the slider from at least region 590 adjacent sub-ambient cavities 534 and 536 to slots 592 and leading edge 514 between slots 592.

Figure 11:
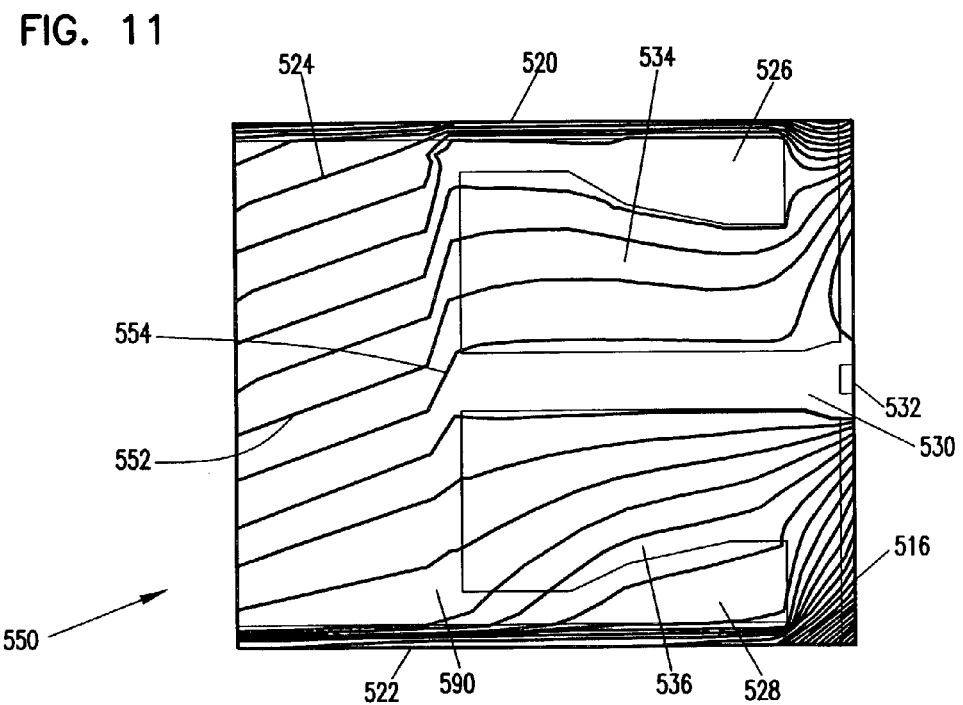
FIG. 11 is a plan view, as in FIG. 9, illustrating the airflow pattern for the slider illustrated in FIG. 9.

As shown particularly in FIG. 11, when slider 510 is skewed to the airflow, as shown by arrow 550, an airflow pattern 552 is formed across ABS 524. The flow pattern may alter slightly at 554 due to any step level cavities in region 590, and then flow across at least side rail 528 adjacent side 522 and through sub-ambient cavities 534 and 536 to the trailing edge 516. More particularly, step level cavities in region 590 adjacent center rail 530 and sub-ambient cavities 534 and 536 assist in diverting airflow from the central portion of ABS 524 to the leeward sub-ambient cavity (cavity 534 in the skew orientation of FIG. 11), away from center rail 530. Airflow confronting leading edge 514 adjacent leeward side 520 flows off the slider at side 520. Airflow confronting windward side 522 flows across side rail 528 to the trailing edge or into sub-ambient cavity 536 to the trailing edge. Importantly, airflow is minimized along the center rail to the trailing edge and transducer 532. Consequently, debris carried by the air is minimized to the trailing edge of the slider features and to transducer 532, so that little if any particulate matter reaches or accumulates on or at the trailing edge and transducer 532.

The presence of step level slots 592 at the leading edge 514 of slider 510 assures an even admission of airflow to ABS 524. The absence of a cross channel, at either a step level or cavity level, assures that the flow of air across the ABS is evenly distributed. The presence of center rail 530 extending from cavity dam 518 to trailing edge 516 and the presence of sub-ambient cavities 534 and 536 on opposite sides of center rail 530 effectively diverts airflow, and particulate matter carried by the air, from reaching the trailing edge slider features, including transducer 532, on the center rail.

Preferably, side rails 526 and 528 do not extend to the trailing edge 516 of slider 510 so that the only slider features at the ABS level at the trailing edge are the center rail and transducer 532. Also preferably, step level cavities in region 590 assist in diverting airflow the central portion of ABS 524 to the leeward sub-ambient cavity 534 or 536 and away from center rail 530.

The present invention thus provides an AAB slider 510 having a leading edge 514 generally impinging fluid flow 250 due to movement of a medium 107 relative to the slider. A transducer 532 is supported by the slider adjacent a trailing edge 516 of the slider. A cavity dam 518 defines an air bearing surface 524 that extends to leading edge 514. Air bearing surface 524 on cavity dam 518 extends continuously, in an unbroken fashion, over a region between opposite sides 520 and 522 of slider 510 from step level slots 592 and the leading edge 514 between step level slots 592 to at least adjacent sub-ambient cavities 534 and 536. The step level slots admit fluid into a space adjacent the region of the air bearing surface.

A center rail 530 extends rearward from cavity dam 518 to the trailing edge 516 between the side rails. A transducer 532 is supported on center rail 530 at the trailing edge 516. A first sub-ambient cavity 534 is between the first side rail 534 and the center rail 530, and a second sub-ambient cavity 536 is between the second side rail 536 and the center rail 530.

Slider 510 is characterized by the absence of a channel in the air bearing surface that extends between the sides of the slider adjacent the leading edge, as in slider 310 and 410.

Although the present invention has been described with reference to magnetic disc storage devices, those skilled in the art will recognize that the present invention may be practiced with other system modifications, including but not limited to optical disc storage systems and to systems employing other technologies that require an element to fly at controlled orientations relative to another element.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application for the slider while maintaining substantially the same functionality without departing from the scope and spirit of the present invention. Thus, while the invention is described in connection with AAB sliders, other flying devices with advanced flying characteristics might also employ the teaching of the present invention. Additionally, the specific configuration of step level, or even cavity level surfaces on the rails and in region 590 of the ABS is not limiting on the invention, as any configuration suitable for the particular application may be employed without departing from the scope or spirit of the invention.

What is claimed is:

1. A slider comprising:
   a leading edge;
   a trailing edge;
   a cavity dam extending to the leading edge;
   first and second side rails extending rearward from the cavity dam along opposite sides of the slider;
   a center rail extending rearward from the cavity dam to the trailing edge between the first and second side rails;
   a transducer supported by the center rail at the trailing edge;
   at least one sub-ambient cavity between the first and second side rails, including a first sub-ambient cavity between the first side rail and the center rail, and a second sub-ambient cavity between the second side rail and the center rail;
   a continuous air bearing surface extending over a region on the cavity dam between the opposite sides from at least adjacent the at least one sub-ambient cavity to the leading edge; and
   more than two spaced-apart step level slots extending into the air bearing surface at the leading edge to admit fluid into a space adjacent the region of the air bearing surface on the cavity dam, wherein each step level slot has a bottom surface that resides in a shallow plane between the air bearing surface and a bottom surface of the at least one sub-ambient cavity, and wherein each step level slot is bounded on at least three sides by the continuous air bearing surface.

2. The slider of claim 1, wherein the side rails include: step level surfaces in one or more planes between the air bearing surface and the bottom surface of the sub-ambient cavities.

3. The slider of claim 2, further including: a step level region in the cavity dam adjacent at least the center rail and first and second sub-ambient cavities.

4. The slider of claim 1, further including: a step level region in the cavity dam adjacent at least the center rail and first and second sub-ambient cavities.

5. The slider of claim 1, wherein the side rails include: step level surfaces in one or more planes between the air bearing surface and the bottom surface of the at least one sub-ambient cavity.

6. A slider comprising:
   a leading edge;
   a trailing edge;
   a cavity dam extending to the leading edge;
   first and second side rails extending rearward from the cavity dam along opposite sides of the slider;

a center rail extending rearward from the cavity dam to the trailing edge between the first and second side rails;

a transducer supported by the center rail at the trailing edge;

at least one sub-ambient cavity between the first and second side rails, including a first sub-ambient cavity between the first side rail and the center rail, and a second sub-ambient cavity between the second side rail and the center rail;

an air bearing surface extending over a region on the cavity dam between the opposite sides from at least adjacent the at least one sub-ambient cavity to the leading edge, the air bearing surface being characterized by the absence of a channel that extends between the sides at or adjacent the leading edge; and more than two spaced-apart step level slots extending into the air bearing surface along the cavity dam at the leading edge to admit fluid into a space adjacent the region of the air bearing surface on the cavity dam, wherein each step level slot has a bottom surface that resides in a shallow plane between the air bearing surface and a bottom surface of the at least one sub-ambient cavity, and wherein each step level slot is bounded on at least three sides by the air bearing surface.

7. The slider of claim 6, wherein the side rails include:
step level surfaces in one or more planes between the air bearing surface and the bottom surface of the sub-ambient cavities.

8. The slider of claim 7, further including:
a step level region in the cavity dam adjacent at least the center rail and first and second sub-ambient cavities.

9. The slider of claim 6, further including:
a step level region in the cavity dam adjacent at least the center rail and first and second sub-ambient cavities.

10. The slider of claim 6, wherein the side rails include:
step level surfaces in one or more planes between the air bearing surface and the bottom surface of the at least one sub-ambient cavity.

11. An AAB slider comprising:
a slider body having a leading edge, a trailing edge and first and second opposite sides;
a cavity dam extending to the leading edge;

first and second side rails extending rearward from the cavity dam along the opposite sides of the slider;

a center rail extending rearward from the cavity dam to the trailing edge between the first and second side rails;

a transducer supported by the center rail at the trailing edge;

at least one sub-ambient cavity between the first and second side rails, including a first sub-ambient cavity between the first side rail and the center rail, and a second sub-ambient cavity between the second side rail and the center rail;

a continuous air bearing surface extending over a region on the cavity dam between the opposite sides from at least adjacent the at least one sub-ambient cavity to the leading edge; and more than two spaced-apart step level slots extending into the air bearing surface along the cavity dam at the leading edge to admit fluid into a space adjacent the region of the air bearing surface on the cavity dam, wherein each step level slot has a bottom surface that resides in a shallow plane between the air bearing surface and a bottom surface of the at least one sub-ambient cavity, and wherein each step level slot is bounded on at least three sides by the air bearing surface.

12. The AAB slider of claim 11, wherein the side rails include:
step level surfaces in one or more planes between the air bearing surface and the bottom surface of the sub-ambient cavities.

13. The AAB slider of claim 12, further including:
a step level region in the cavity dam adjacent at least the center rail and first and second sub-ambient cavities.

14. The AAB slider of claim 11, further including:
a step level region in the cavity dam adjacent at least the center rail and first and second sub-ambient cavities.

15. The AAB slider of claim 11, wherein the side rails include:
step level surfaces in one or more planes between the air bearing surface and the bottom surface of the at least one sub-ambient cavity.

* * * * *